United States Patent [19]

Kirn et al.

[11] Patent Number: 5,466,183
[45] Date of Patent: Nov. 14, 1995

[54] HAND HELD POWER TOOL WITH LOCKING ROTATABLE APPENDAGE

[75] Inventors: Manfred Kirn, Stuttgart; Erich Borst, Leinfelden-Echterdingen; Guenter Schaal, Leinfelden-Echterdingen; Manfred-Wilhelm Staebler, Leinfelden-Echterdingen; Bernard Eicher, Filderstadt, all of Germany

[73] Assignee: Robert Bosch GmbH, Stuttgart, Germany

[21] Appl. No.: 94,149

[22] PCT Filed: Dec. 18, 1991

[86] PCT No.: PCT/DE91/00988

§ 371 Date: Jul. 23, 1993

§ 102(e) Date: Jul. 23, 1993

[87] PCT Pub. No.: WO92/13678

PCT Pub. Date: Aug. 20, 1992

[30] Foreign Application Priority Data

Jan. 31, 1991 [DE] Germany .......................... 41 02 838.4

[51] Int. Cl.⁶ .............................. B24B 23/00; B24B 23/02
[52] U.S. Cl. .......................... 451/359; 451/357; 451/358; 30/517; 30/518; 173/170
[58] Field of Search .......................... 173/170; 51/170 R, 51/170 T, 170 MT, 170 PT, 180, 174; 30/517, 519; 451/344, 358, 357, 359, 350, 354

[56] References Cited

U.S. PATENT DOCUMENTS 1,702,742  2/1929  Moretti .................................. 173/170
3,602,318  8/1971  Slany ..................................... 173/170
5,065,476  11/1991  Dohse et al. .......................... 16/114 R
5,201,146  4/1993  Fushiya ................................. 51/170 R

FOREIGN PATENT DOCUMENTS 1068145  10/1959  Germany .............................. 51/170 T
4021277  3/1991  Germany .
4022668  1/1992  Germany .
1437304  7/1974  United Kingdom ................. 51/170 R Primary Examiner—Jack W. Lavinder
Attorney, Agent, or Firm—Michael J. Striker

[57] ABSTRACT

A hand-held power tool, particularly hand-operated angle grinder has a device housing having a motor housing receiving an electric drive, a gear head arranged at one end of the motor housing and having a projecting drive spindle for a tool, and a handle arranged at another end of the motor housing and having a switch strip for switching the electric drive on and off, at least one of the handle and the gear head forming a rotatable housing part and being rotatable relative to the motor housing around a longitudinal axis of the motor housing. A manually actuated positioning device fixes the rotatable housing part in at least two different rotational positions, while the motor housing being provided with a central bearing neck, the rotatable housing part being provided with a rotating cross which is received on the bearing neck so as to be rotatable and secured against axial displacement, the positioning device being formed to cause a positive-locking engagement between the motor housing and the rotating cross.

7 Claims, 3 Drawing Sheets

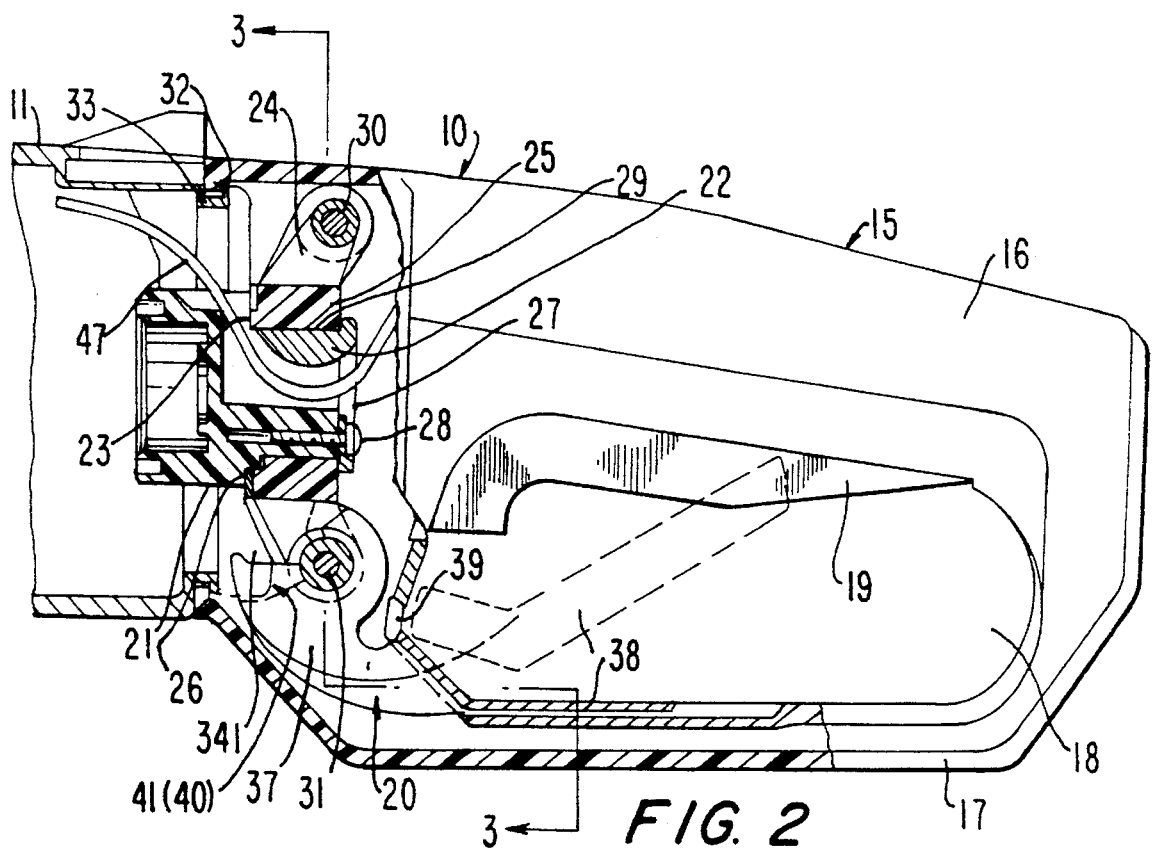
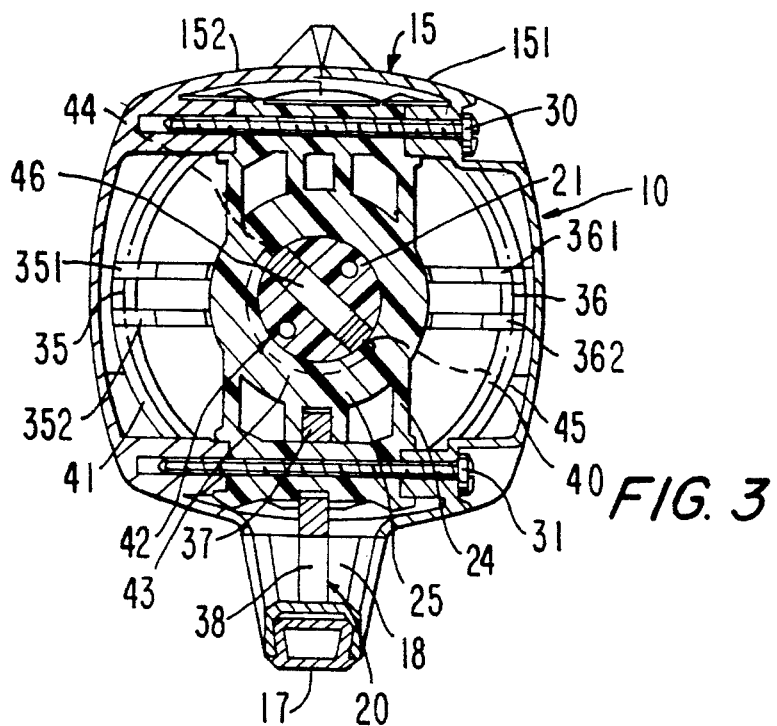

HAND HELD POWER TOOL WITH LOCKING ROTATABLE APPENDAGE

BACKGROUND OF THE INVENTION

The present invention relates to a hand-held power tool, particularly a hand-operated angle grinder.

In particular it relates to such a hand-held power tool which has a device housing divided into a motor housing for receiving an electric drive, a gear head and a handle arranged on opposite ends of the housing and rotatable relative to the latter, and a positioning device for fixing housing parts in at least two different positions.

Presently, hand-held power tools, particularly hand-operated angle grinders, are outfitted with an on/off switch for the electric drive which is actuated via the switch strip. The switch strip is situated at the underside of the handle and is actuated by at least one finger when grasping the handle and held in an actuated position while working with the machine. The ergonomic design of the handle, e.g. the cross-sectional shape and angle of inclination relative to the device axis, is optimized for one individual working position of the machine.

Some hand-held power tools are used in more than one work position for various working operations. Apart from grinding or scouring, for example, an angle grinder is also used e.g. for parting or cutting stone slabs or plates. The optimal work position mentioned above is normally provided for the scouring work position in which the grinding disk faces downward, i.e. roughly parallel to the switch strip. However, for cutting work the angle grinder is rotated by 90° toward the left or right around its longitudinal axis so that the cutting wheel is roughly vertical to the workpiece. Due to this rotation, the handle and switch strip assume an unfavorable position for the hand of the person grasping it. If the machine is rotated to the left and the handle is grasped with the right hand, the switch strip lies in the ball of the thumb. If the machine is rotated to the right and held in the right hand, the switch strip is only actuated and held by the thumb. In either case, it is not possible to hold the switch strip in a secure and comfortable manner. Moreover, in emergency situations the user cannot react quickly enough to switch off the machine in view of the position of the safety catch and switch lock.

To avoid this disadvantage there is already a hand-held power tool of the type mentioned above in which the handle part of the housing or the gear head part of the housing is held at the motor housing so as to be rotatable and can be fixed in defined rotational positions by a positioning device to achieve a working position which is more favorable ergonomically.

In a hand-held power tool of this type which has already been suggested (P 40 22 668.9) the rotation of the handle and gear head is enabled in that the shell-like housing of the rotatable housing part is provided with a radially projecting collar which engages in a circumferential groove at the motor housing. The manually actuated positioning device includes a locking arrangement for locking the rotatable housing part at the motor housing and a clamping device for clamping the rotatable housing part at the motor housing. The locking arrangement has at least two locking grooves which are arranged in the motor housing so as to be offset relative to one another by a rotational angle and a locking cam which can be swiveled in the shell housing of the rotatable housing part and is capable of positive engagement in one of the locking grooves. The clamping device has a clamping screw which extends transversely to a longitudinal slot in the projecting collar of the shell housing. The clamping screw can be screwed into a thread by a clamping lever and can cause the regions of the shell housing at both sides of the longitudinal slot to move together while reducing the width of the longitudinal slot. It is necessary to provide the clamping device in addition to the locking arrangement on the one hand so as to ensure a slight rotational movement of the rotatable housing part at the motor housing and on the other hand so that a rigid connection of the motor housing and rotatable housing parts is always provided when working with the hand-held power tool in different relative positions of these housing parts.

SUMMARY OF THE INVENTION

Accordingly, it is an object of the present invention to provide a hand-held power tool of the above-mentioned type, which avoids the disadvantages of the prior art.

In keeping with these objects and with others which will become apparent hereinafter, one feature of the present invention resides, briefly stated, in a hand-held power tool in which a central bearing neck is formed at the motor housing, a rotating cross is received on the bearing neck so as to be rotatable and secured against axial displacement in that the rotating cross is securely connected with the rotatable housing part, and the positioning device causes a positive-locking engagement between the motor housing and the rotating cross.

When the hand-held power tool is designed in accordance with the present invention, it has the advantage over the prior art that it achieves a good rotational guidance of the rotatable housing part at the motor housing which runs smoothly on the one hand and reliably prevents relative movement between the device housing and rotatable housing part in the longitudinal direction on the other hand. Accordingly, there is no need for a clamping device in addition to the locking device. In spite of the smooth rotatability of the rotatable housing part, the housing of the power tool is dimensionally stable in every locking position, which ensures good handling. Since the clamping device is dispensed with, the hand-held power tool has a simpler construction, which results in lower production costs.

According to a preferred embodiment form of the invention, the positioning device has at least two rib pairs which are constructed at the motor housing and arranged so as to be offset relative to one another by a predetermined rotational angle, the radially extending ribs being arranged so as to be parallel at a distance from one another, and a locking cam which is swivelably held at the rotating cross and is capable of engaging between a rib pair, respectively, with lateral positive engagement. The locking cam is rigidly connected with a manually swivelable catch lever which projects out of the rotatable housing part.

In hand-held power tools in which the rotatable housing part is formed by the handle which has a clip or stirrup extending along the switch strip at a distance thereto, the catch lever is advantageously approximately U-shaped in cross section and is shaped in such a way that in the locking position it covers the stirrup at the handle on the side facing the switch strip. When the positioning device is disengaged, this catch lever swivels in the direction of the switch strip and blocks the grip-through opening located between the switch strip and stirrup so that the user cannot place his hand through the opening. Thus the user is automatically made aware that the positioning device is unlocked.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 shows an enlarged view of the handle with parts of the motor housing of the angle grinder in FIG. 1, partially in section;

FIG. 3 shows a section along line II—II in FIG. 2; and

DESCRIPTION OF THE PREFERRED EMBODIMENT

Figure 1:
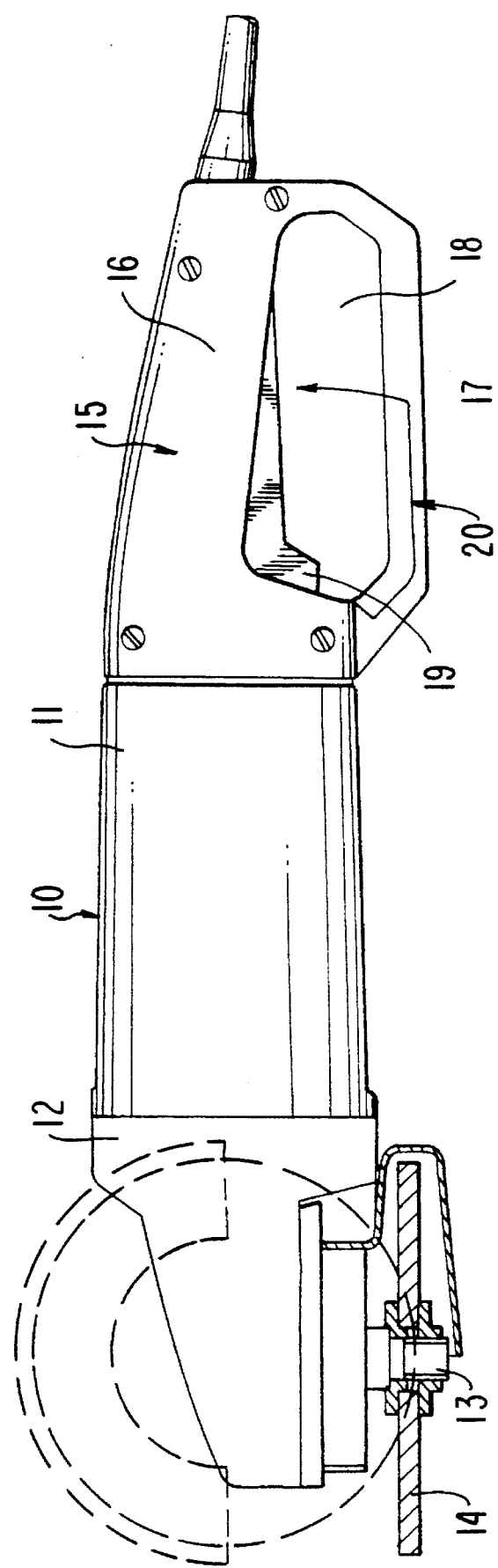
FIG. 1 shows a side view of a hand-operated electric angle grinder.
Figure 4:
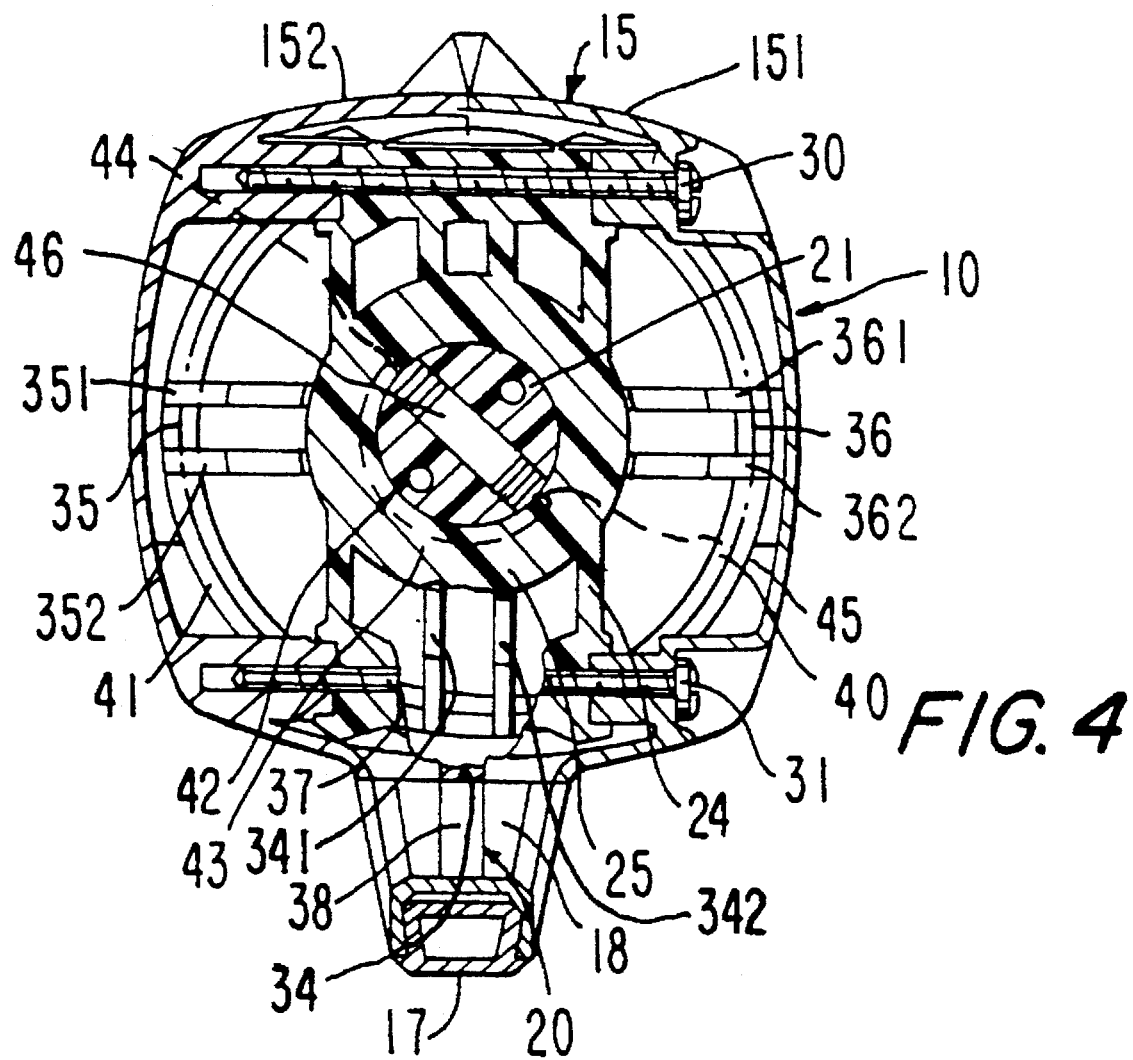
FIG. 4 is a view substantially corresponding to the view of FIG. 3 but showing another embodiment of the invention.

The hand-operated electric angle grinder shown in a side view in FIG. 1 as an embodiment example for a common electric hand-held power tool has a device housing 10 divided into a motor housing 11, a gear head 12 which is arranged at one end of the motor housing 11 and has a projecting drive spindle 13 for a grinding disk 14, and into a handle 15 which is arranged at the other end of the motor housing 11 and is constructed so as to be rotatable at the motor housing 11 around the longitudinal axis of the latter over a predetermined rotational area. The handle 15 includes a handle stock 16 which is grasped by the hand when working with the angle grinder and a stirrup 17 which is integral with the handle stock 16 and extends along the underside of the handle stock 16 so as to form a grip-through opening 18 and provides protection from below for the user's finger which is placed around the handle stock 16 when working with the angle grinder. A switch strip 19 which actuates an on/off switch for an electric drive motor accommodated in the motor housing 11 projects into the grip-through opening 18 at the underside of the handle stock 16 facing the stirrup 17. The gear head 12 is securely connected with the motor housing 11, while the handle 15 which is rotatable at the motor housing 11 can be fixed in three different rotational positions by a positioning device 20 at the motor housing 11. In the relative position of the motor housing 11 and handle 15 shown in FIG. 1 the angle grinder is used for so-called scouring. In this relative position, the grinding disk 14 is roughly parallel to the switch strip 19. By rotating the handle 15 or the motor housing 11 by 90° to the left or right, the angle grinder can be moved out of this scouring position and provided for "cutting" work. In this work position of the angle grinder the handle 15 is maintained in the position shown in FIG. 1 and the motor housing 11, including the gear head 12, is rotated by 90° so that the grinding disk 14 assumes the position shown in dashed lines in FIG. 1 in which it is aligned approximately at a right angle to the switch strip 19.

The positioning devices 20 and the rotatable mounting of the handle 15 at the motor housing 11 are shown in detail in FIGS. 2 and 3. A central bearing neck 21 is injection molded so as to be integral with the motor housing 11. A neck portion 22 at the bearing neck 21 is reduced in diameter toward the free end and an annular shoulder 23 is constructed at the transition of the bearing neck 21 into the neck portion 22. The bearing neck 21 with neck portion 22 is manufactured from plastic, as is the motor housing 11, and is formed on at the motor housing 11 simultaneously during the injection molding process. A rotating cross 24 with an annular collar 25 is held on the neck portion 22 of the bearing neck 21 so as to be rotatable and secured against axial displacement. The annular collar 25 is supported axially at the annular shoulder 23 of the bearing neck 21 via a sliding disk 26 and is secured against axial displacement by a clamping plate 27. The clamping plate 27 is screwed onto the free end of the neck portion 22 by screws 28 and a disk spring 29 is inserted between the clamping plate 27 and the end face of the annular collar 25 at the rotating cross 24. The rotating cross 24 is manufactured from plastic and screwed by two screws 30, 31 to the handle 15 which has two housing shells 151 and 152 which are held together by the two screws 30, 31 simultaneously. The two housing shells 151, 152 engage by means of a radial projection 32 in a circumferential groove 33 formed at the motor housing 11 so as to provide dust-resistant covering.

The positioning device 20 has three rib pairs 34, 35, 36 which are formed at the motor housing and offset relative to one another by a rotational angle of 90°. The ribs of the rib pairs 34, 35, 36 are arranged so as to be parallel at a distance from one another and extend radially. FIG. 3 shows the ribs 351, 352 and 361, 362 of the rib pairs 35, 36 and FIG. 2 shows only the ribs 341 of the rib pair 34. The positioning device 20 also includes a locking cam 37 which is swivelably supported at the rotating cross 24, Its axial width corresponds to the clearance distance between the ribs of the rib pairs 34–36 so that it can be swiveled in between the rib pairs 34–36 with lateral positive engagement. The locking cam 37 is connected integrally with a manually swivelable catch lever 38 which projects through a cut out portion 39 in the two housing shells 151, 152 and projects into the grip-through opening 18 of the handle 15. The catch lever 38 is approximately U-shaped in cross section and is shaped in such a way that it covers the stirrup 17 on the side facing the switch strip 19 in its locking position in which the locking cam 37 engages in a positive-locking manner between the ribs of one of the rib pairs 34–36. When disengaging the positioning device 20, the catch lever 38 is swiveled in the direction of the arrow in FIGS. 1 and 2 and projects into the grip-through opening 18 in the handle 15 (catch lever 38 shown in dashed lines in FIG. 2). The grip-through opening 18 is accordingly blocked so that the gripping hand of the user cannot be inserted and the unlocked positioning device (20) is therefore brought to the attention of the user. A ring segment 40 and 41, respectively, which extends in the rotating direction of the rotating cross 24 coaxially relative to the latter is arranged between the rib pairs 34, 35, 36 in such a way that the locking cam 37 which is swiveled out of its locking position slides along these ring segments 40, 41 at a slight distance from them during the rotation of the handle 15 or motor housing 11 and cannot be swiveled back. This prevents the catch lever 38 from swiveling up toward the stirrup 17 of the handle 15 outside the predetermined locking positions, and the locking cam 37 is accordingly prevented from rotating in front of the ribs of the rib pairs 34–36.

For the purpose of limiting the rotatability of the handle 15 and simultaneously for the adjustment of the 90-degree rotational positions of the handle 15, a radially projecting stop cam 42 (FIG. 3) is arranged at the bearing neck 21 and a recess 43 extending annularly over 180° is provided in the annular collar 25, the stop cam 42 projecting into the recess 43. The annular recess 43 is arranged in such a way that the locking cam 37 which is supported at the rotating cross 24 so as to be swivelable is automatically aligned with one of the rib pairs 35, 36 at the motor housing 11 when one of the two radial defining surfaces 44 and 45, respectively, of the recess 43 strikes the stop cam 42. The rib pairs 34–36 simultaneously serve to support the central bearing neck 21 at the motor housing 11. The bearing neck 21 has an axial opening 46 through which the electric connecting cable 47 is guided to the drive motor from the on/off switch actuated by the switch strip 19.

It will be understood that each of the elements described above, or two or more together, may also find a useful application in other types of constructions differing from the types described above.

While the invention has been illustrated and described as embodied in a hand-held power tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A hand-held power tool, comprising a device housing having a motor housing receiving an electric drive, a gear head arranged at one end of said motor housing and having a projecting drive spindle for a tool, and a handle attached to another end of said motor housing and having a switch strip for switching said electric drive on and off, said handle being rotatable relative to said motor housing around a longitudinal axis of said motor housing; a manually actuated positioning device for fixing said handle in at least two different rotational positions, said motor housing being provided with a central bearing neck, said handle being provided with a rotating cross which is received on said bearing neck so as to be rotatable and secured against axial displacement, said positioning device being formed to cause a positive-locking engagement between said motor housing and said rotating cross; a manually actuated catch lever including a locking cam at one end of the lever, the lever having a locking and an unlocking position, the lever in the locking position via the locking cam causes a positive-locking engagement between said motor housing and said rotating cross and in the unlocking position, the lever projects out of said handle, said catch lever being formed so that it covers said stirrup on a side facing said switch strip in its locking position, said catch lever being in the range of fingers of a hand of a user holding said handle and being in disengaging position blocking said handle from a gripping hand.

2. A device as defined in claim 1, wherein said positioning device includes at least two rib pairs formed at said motor housing and arranged so as to be offset relative to one another by a predetermined rotational angle, ribs of said rib pairs being arranged parallel to one another at a distance from one another and extending radially, and a locking cam which is swivelably held at said rotating cross and is engageable respectively between said ribs of each of said rib pairs with lateral positive engagement.

3. A device as defined in claim 2, wherein said catch lever is approximately U-shaped in cross-section.

4. A device as defined in claim 1; and further comprising a ring segment which extends in a rotating direction of said rotating cross and arranged between said two rib pairs so that said locking cam which is swivelled out of its locking position slides along said ring segment at a slight distance from it during a rotation of said rotatable housing part and is prevented from swivelling back.

5. A device as defined in claim 1, wherein said bearing neck has an axial opening; and further comprising a connecting cable provided for said switch strip and guiding through said axial opening of said bearing neck.

6. A hand-held power tool, comprising a device housing having a motor housing receiving an electric drive, a gear head arranged at one end of said motor housing and having a projecting drive spindle for a tool, and a handle attached to another end of said motor housing and having a switch strip for switching said electric drive on and off, said handle being rotatable relative to said motor housing around a longitudinal axis of said motor housing; a manually actuated positioning device for fixing said handle in at least two different rotational positions, said motor housing being provided with a central bearing neck, said handle being provided with a rotating cross which is received on said bearing neck so as to be rotatable and secured against axial displacement, said positioning device being formed to cause a positive-locking engagement between said motor housing and said rotating cross, said bearing neck having an annular shoulder and said rotating cross has an annular collar which is axially supported on said annular shoulder of said bearing neck so that said rotating cross sits on said bearing neck with an annular collar; a sliding disk through which said annular collar is axially supported at said annular shoulder of said bearing neck; a clamping plate fastened at a free end of said bearing neck; and a disk spring supported between said clamping plate and said annular collar of said rotating cross.

7. A device as defined in claim 6, wherein said bearing neck has a radially projecting stop cam, said annular collar having an annular recess in which said stop cam projects and whose length and arrangement are such that said locking cam which is supported at said rotating cross so as to be swivellable is aligned with one of said rib pairs at said motor housing for swivelling in between said ribs when one of two radial defining surfaces of said recess strike said stop cam.

* * * * *